June 5, 1945. E. R. SAWTELLE ET AL 2,377,380
MOWING MACHINE
Original Filed Sept. 15, 1942 5 Sheets-Sheet 3
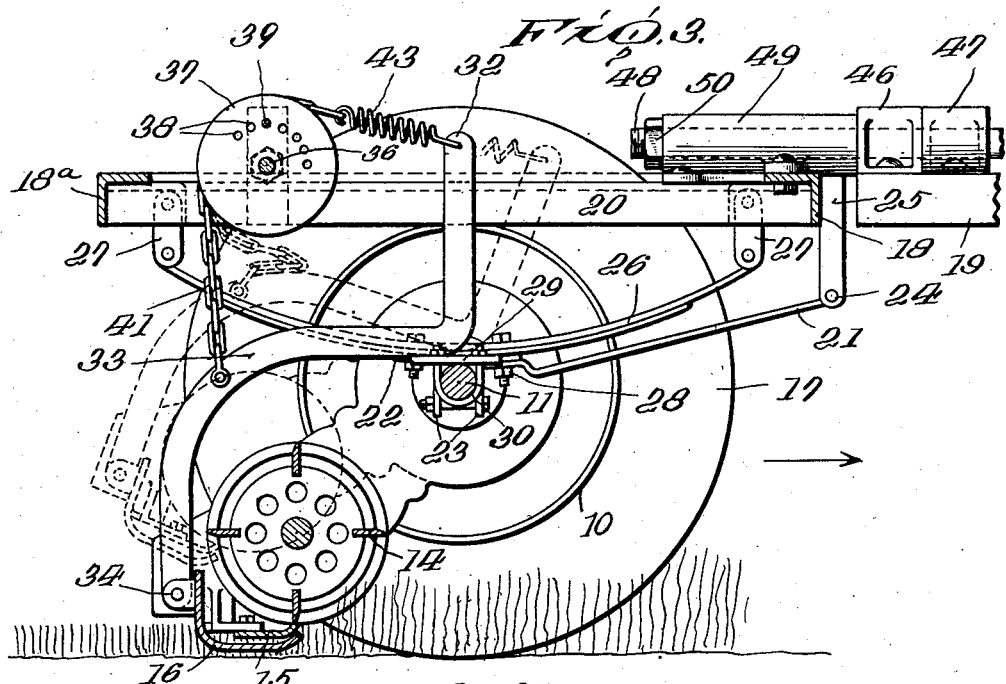
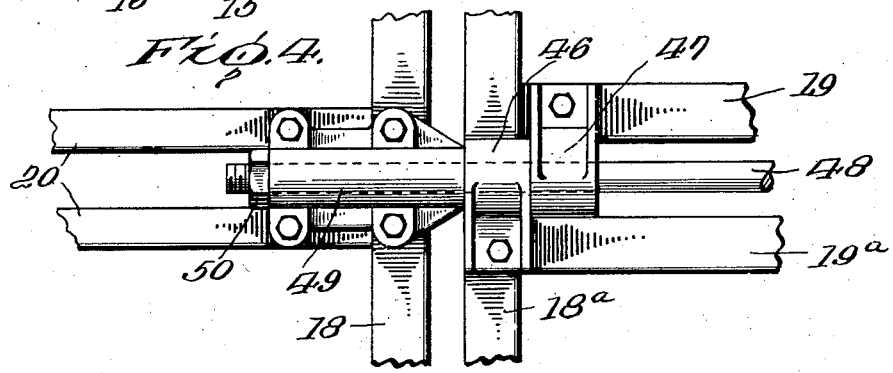
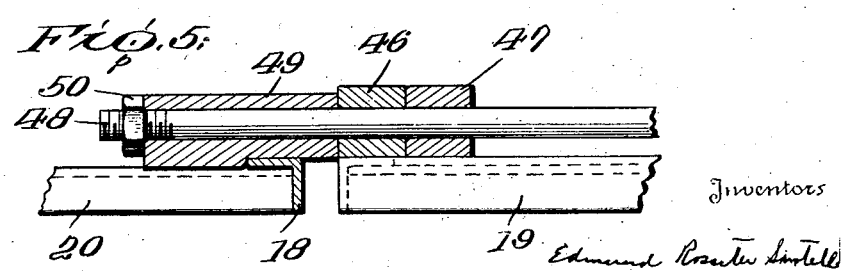

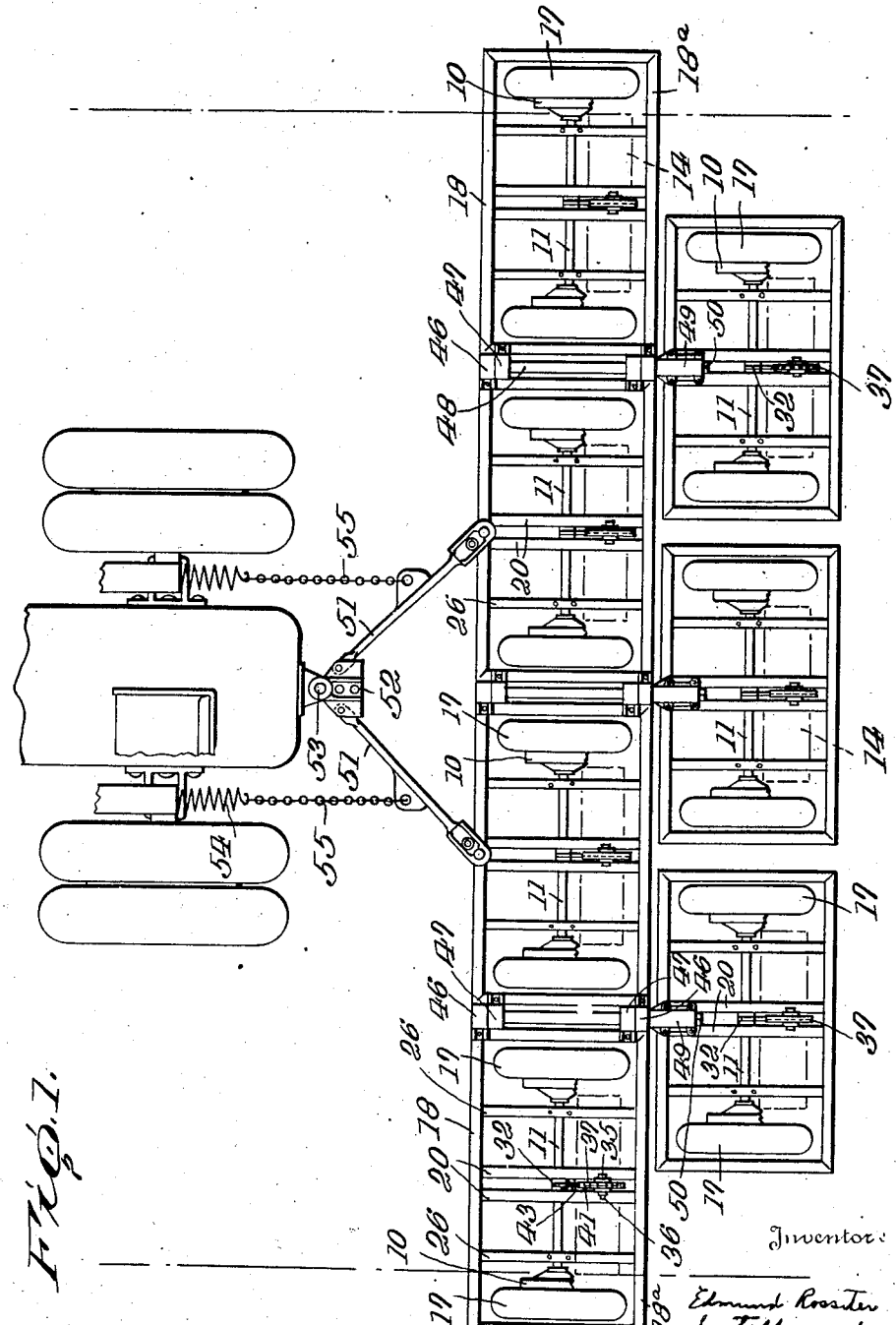

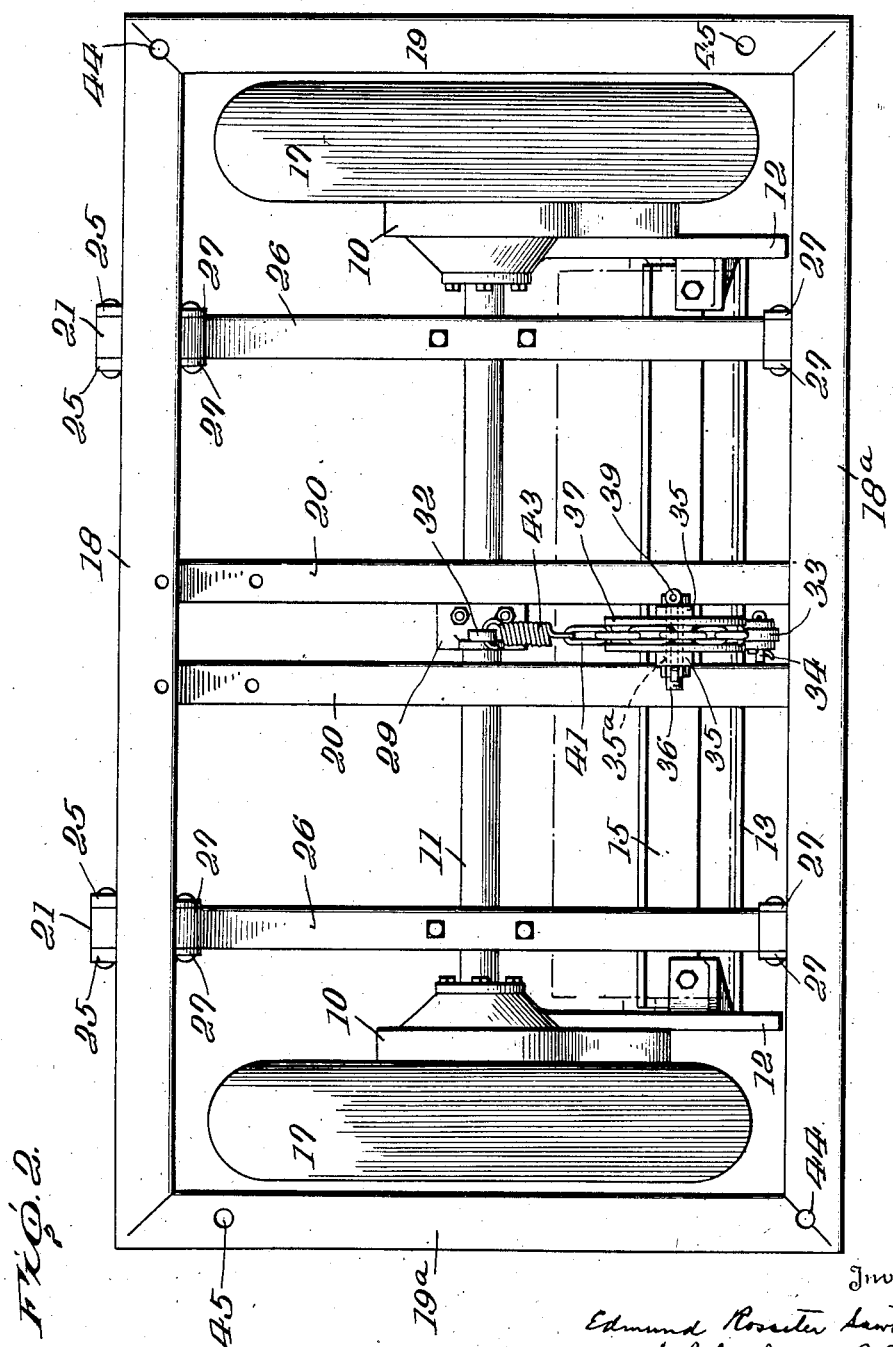

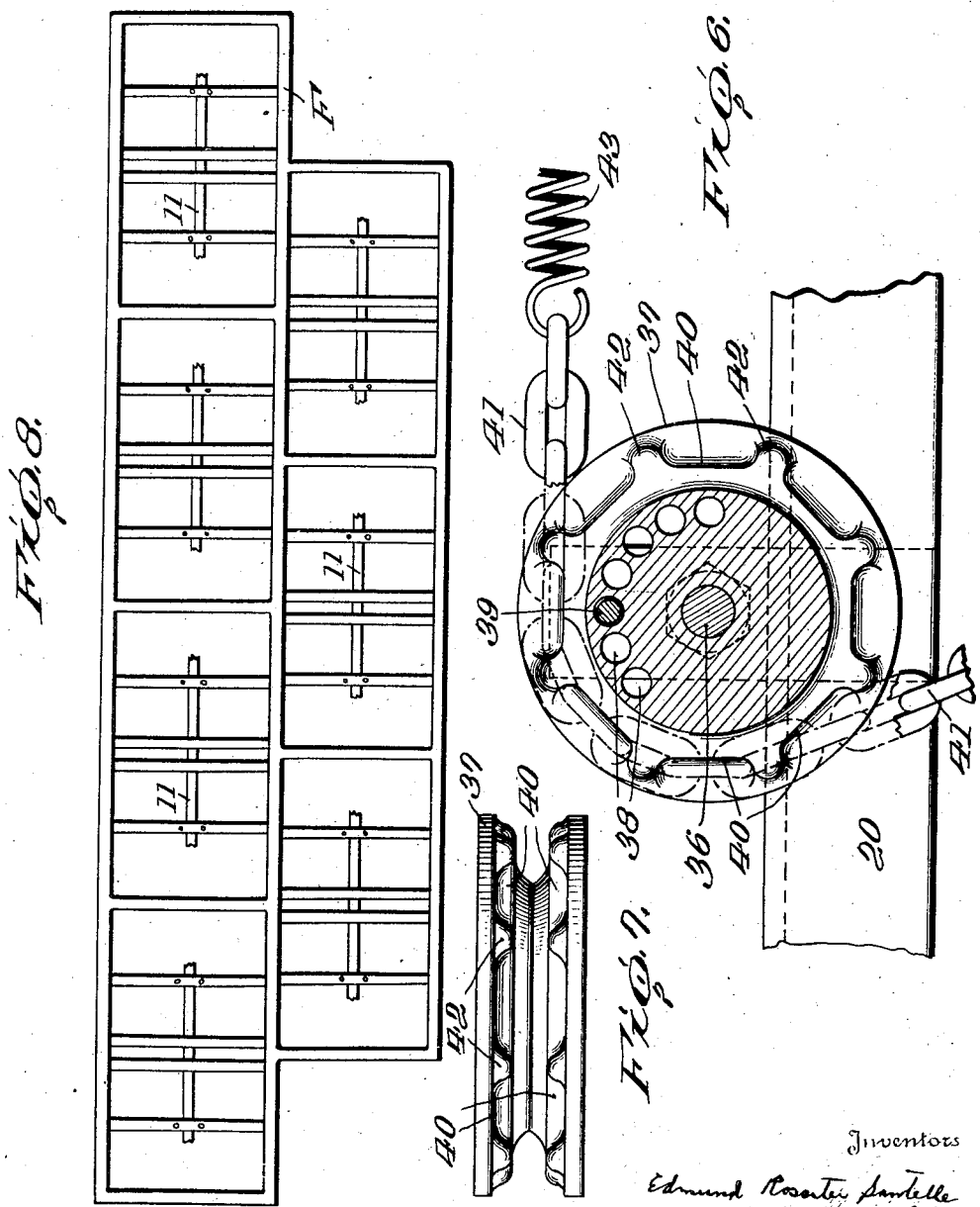

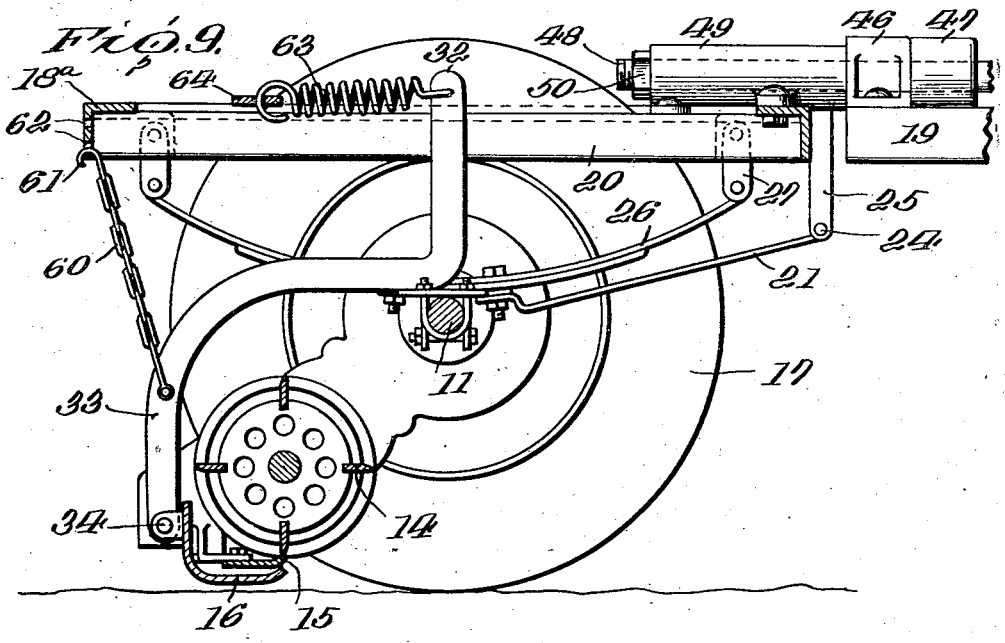
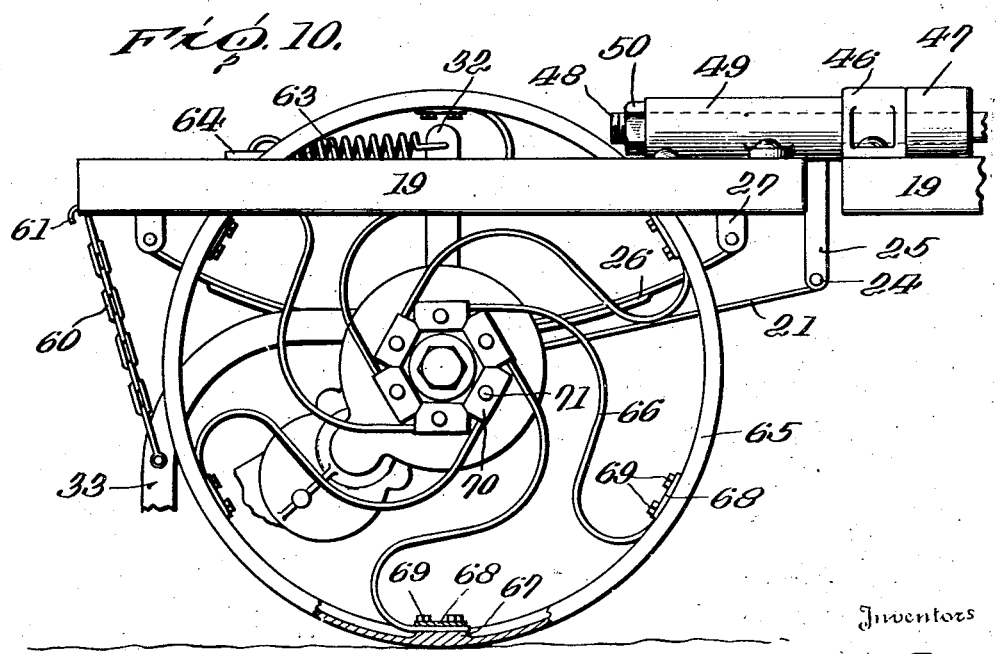

Patented June 5, 1945

2,377,380

UNITED STATES PATENT OFFICE 2,377,380

MOWING MACHINE

Edmund Rossiter Sawtelle, Shawnee-on-Delaware, and John Insley Blair, Stroudsburg, Pa., assignors to Worthington Mower Company, Stroudsburg, Pa., a corporation of Delaware Continuation of application Serial No. 458,402, September 15, 1942. This application March 30, 1944, Serial No. 528,788

11 Claims. (Cl. 56—7)

This invention is a new kind of multiple unit or gang mowing machine of the rotary cutter-reel type and its object is to increase the general efficiency of such machines, more exactly, to increase the mowing speed at which they can be satisfactorily operated, and reduce at the same time the tractive force per unit required for their propulsion, so as to permit the use of more units and hence wider swaths, up to the limit of the hauling force available.

Heretofore the maximum mowing speed of gang mowers has been limited by the kind of unit and the articulation employed and, so far as we are aware, has not been in excess of 6 to 8 miles per hour, and with sufficient units to cut a 16 ft. swath, the maximum acreage mowable per hour has not exceeded about 11 acres. The principles of unit organization constituting this invention enables the mowing capacity to be much increased, without sacrifice of good mowing, the machine herein shown being capable of a sustained mowing speed of over 20 M. P. H. while properly cutting a swath in excess of 21 ft.

The invention is exemplified, but without limitation, by the structure shown in the accompanying drawings, this application being a continuation of our application filed September 15, 1942, Serial No. 458,402.

Figure 1 is a top plan of a seven-gang mower with the propelling vehicle shown in part.

Figure 2 is an enlarged top plan view of an individual cutting unit and frame assembly.

Figure 3 is a similar enlarged side view, in section, showing an individual cutting unit and frame assembly.

Figure 4 is an enlarged fragmentary top plan view of the pivotal connection between adjacent frame sections.

Figure 5 is a longitudinal sectional view of Figure 4.

Figure 6 is a further enlarged transverse sectional view showing one form of suspension means for the cutting units.

Figure 7 is a top plan view of the pulley over which the chain is trained.

Figure 8 is a top plan view of a modified form of traction framework which is of substantially rigid construction throughout.

Figure 9 is a fragmentary detailed view of a modified form of suspension means for the cutting units.

Figure 10 is a side elevation showing a modified form of ground engaging wheel for supporting the frame and a cutting unit.

The cutter frame for each mower unit consists of a pair of gear housings 10 mounted at opposite ends of a cross rod 11 and side plates 12 extending rearwardly from the gear housings. The ends of the side plates 12 are joined by a brace 13. A rotary cutting reel 14 is journalled in the gear housings 10 and is adapted to cooperate in the conventional manner with a bed knife 15 which is secured to the side plates. As particularly shown in Figure 3, there may be provided a guard 16, formed as a part of the brace 13, and extending beneath the bed knife to protect the same against any obstructions which may be encountered. The cutter frame is supported on a pair of ground wheels which are illustrated as having pneumatic tires 17 and constitute means for rotating the cutting reel 14 through gearing (not shown) enclosed within the housings 10. The cutting mechanism at the free end of the cutter frame is capable of pivotal movement about the axis of the two wheels on which it is mounted. This is a horizontal, transverse axis, that is to say, an axis which is square to the direction of travel. The cutter mechanism is suspended from the traction framework, presently described, so that it maintains a predetermined and constant elevation from the ground, thus establishing the height of cut. By the new method of frame organization this height of cut once adjusted remains constant notwithstanding ground undulations that may be traversed and not withstanding also that these units are devoid of the usual rear ground rollers which have heretofore been the only means relied on for maintaining a constant height of cut in gang mowers.

As a suitable means of cutter suspension, a bracket member 29 is centrally and rigidly secured to the cross rod 11 by means of a U-bolt 30, which extends around the cross rod. A lever 31 is secured to the bracket member 29 by welding or the like, and this lever includes an arm 32 which extends upwardly between the frame members 20. The lever also includes a rearwardly and downwardly extending arm portion 33, which is connected, as at 34, to the rear end of the cutter frame. Two lugs 35 on the traction frame form a bracket for supporting a shaft 36, on which a pulley 37 is mounted. The pulley is provided with a plurality of openings 38 extending axially therethrough, and these openings are adapted to register with similar openings 35—a through the upper ends of the lugs 35. In this manner the pulley 37 can be maintained in any adjusted position by inserting a pin 39, or the like, through the aligned openings.

The periphery of the pulley is provided with recesses 40, which are shaped to snugly receive the links of a chain 41. Between each of the recesses, there are provided shoulders 42, which make the chain non-slipping in the pulley. One end of the chain 41 is connected intermediate the ends of the arm portion 33 of the lever 31, and normally in such a position that the chain depends from the pulley along a line inclined inwardly from the normal vertical line. The opposite end of the chain is connected to a coil spring 43, which is connected to the end of the upstanding lever arm 32. The distance between the rod 11 and the chain connection with the arm 33 is substantially the same as the distance between the rod 11 and the connection between the spring 43 and the arm 32, so that in any adjusted position of the height of cut the combined chain and spring length will remain substantially the same, thus assuring constant tension on the spring 43 in normal operating conditions regardless of adjustment of the height of cut.

In order to adjust the height of cut, the pin 39 may be removed and the pulley turned to any desired position and secured in the adjusted position. The chain thus serves to suspend the rear end of the cutter frame, and the spring 43 interposed between the arm 32 and the chain serves to maintain the links in position within the recessed periphery of the pulley. If the guard 16 strikes an obstruction, the cutter frame is kicked up as shown by the exaggerated dotted line position of Figure 3, but is immediately returned by the action of the spring and without rebound. The main or gang framework by which these cutter frames are held in rows, in overlapping positions, and jointly propelled over the ground, is supported wholly on said pairs of cutter-driving ground wheels and is perfectly rigid or inflexible in planes parallel to the ground or horizontal, and also inflexible in vertical planes which extend in the direction of travel. It may, if desired, be rigid in all planes, as later pointed out in reference to Fig. 8, but preferably it is formed of frame sections articulated only to such extent as to allow it to hinge or flex in vertical transverse planes, that is, about horizontal axes extending in the direction of travel, being rigid in all other respects. It is in any event supported on the wheels by means of connections which hold the wheels always in planes parallel to the travel.

In Figs. 1-6 each traction frame or frame section is individual to one pair of ground wheels, and of rectangular form, made of front and rear bars 18, 18a and side bars 19, 19a, with two intermediate bars 20 at the center, spaced apart to hold the pulley above referred to, and accommodate the movement of the lever 32 which is part of, or fixed to the cutter frame, and projects between these bars.

Each such traction frame is spring-supported on its two ground wheels by means of two leaf springs 26 which are connected to the traction frame by means of shackles 27, and to the cross rod 11 by means of plates 22, one near each end of the cross rod. These plates have arms 23 embracing the cross rod and secured by bolts. The springs 26 permit the cutter frame and the wheels to change their vertical relation to the traction frame, and to tilt with reference to it, but the wheels are at all times parallel to the direction of travel. The traction frame is also connected to the wheels by the two draft links 21 pivotally connected between the plates 22 and bolts 24 on the lower ends of the draft brackets 25 (Fig. 3).

In assembling these mowing units into the gang, a number of them, four in the case of Fig. 1, are hinged together by their lateral adjacent margins, to make the front row, for which purpose each traction frame section is provided with hinge knuckles 46 and 47 appropriately offset so that their pintle-holes will align when the frames are brought together (Fig. 4). These knuckles are attached to their frames by means of bolts in the bolt holes marked 44 and 45 in Fig. 2, and when brought together, the hinge joint is made by pushing a pintle or hinge rod 48 through the aligned knuckles.

These hinge rods 48 can, and preferably do, serve also as the means for connecting the rear row of three units (in the present case) to the front row, for which purpose such rods are extended rearwardly into the swivel bearing brackets 49, which brackets are bolted or otherwise secured to said rear units, centrally thereof. These hinge rods are desirably provided with nuts 50 whereby the front and rear rows or frames can be drawn together and preferably, so that the end of the swivel bearing 45 abuts on the hinge knuckles, as shown in Figs. 4 and 5. This unites the rear units to the front units in close coupled relation making a gang framework which permits no hinging of its component parts except about the hinge rods, that is to say, except on axes extending in the direction of travel, and the individual cutter frames also can have no movement relative to the traction frame except up and down or on axes which also extend in the direction of travel.

Within this principle of assemblage it is apparent that there may be any number of units in each row; also that the vertical longitudinal rigidity of the traction framework accounts for the fact that all of the cutter mechanisms hold a constant elevation from the ground, thus giving constant height of cut across the swath.

By close coupled, as used herein, is meant that the wheel base of the machine, that is to say, the distance between the vertical plane of the axes of the front ground wheels and that of the rear ground wheels, is very short and not appreciably longer than the over-all fore and aft dimension of any of its component units. In the present case the traction frame is lower than the tops of the ground wheels and no larger than will accommodate their vertical action, and the wheel axis of each unit is thus approximately centered under its own traction frame so that when a row of such frames is closely hinged to other frames in front of (or behind) it, the wheel base of the gang becomes approximately equal to the length (longitudinally considered) of one frame. This is found in practice to be short enough to enable the machine to turn fairly sharp corners without tearing the turf, and is an important characteristic of this invention.

In Figure 1, a part of the propelling draft vehicle is illustrated as being of the tractor type. One form of draft connection between the vehicle and the gang is shown as including a pair of arms 51, which are pivotally connected to the centers of adjacent center frame sections of the front row. The arms 51 are directed toward one another and are connected to a block member 52 with limited pivotal movement therebetween. The block member 52 is provided with a forwardly extending recessed part 53, which is adapted to fit over a cooperating part on the tractor to provide a ball and socket draft connection. When operating gang mowers at relatively high speeds, there is a tendency for the gang to sway, and, in order to prevent this "jack-knifing," the tractor or other propelling vehicle is provided with springs 54 which are, in turn, connected by chains 55 or the like to the arms 51 of the triangular hitch. These springs tend to stabilize the gang by resisting any tendency to sway and by snubbing any rebound effects.

For certain conditions of use, a rigid frame may be employed and as shown in Figure 8, such a frame F is illustrated as being shaped similarly with respect to the frame means of Figure 1, although it is to be clearly understood that this frame may be constructed in various ways. This actuating frame F is substantially rigid in that there are no hinge or pivotal connections included therein. The cutting units may be associated with the frame F in the same manner as shown in Figure 1. Thus, leaf springs 26 may be positioned between the frame F and each of the cutting units and similarly, draft bars 21 may be employed.

In Figure 9, there is shown a modified form of suspension means for each cutting unit. Under certain conditions, the pulley 37 may be eliminated and the flexible connection applied directly between one of the cross members 18—a of the traction frame and the frame of a cutting unit. As shown, the chain 60 has the lower end thereof connected to the arm portion 33 and the upper end 61 thereof connected in one or another of the openings 62 in the depending portion of the cross member 18—a. Similarly, the spring 63 tending to resist bouncing of the cutting unit may be directly applied between the lever arm 32 and a cross member 64, welded or otherwise suitably secured to the cross members 20 of the traction frame.

Where it is difficult to obtain pneumatic tires for the ground engaging drive wheels, a spring wheel substantially of the type shown in Figure 10 may be employed. For purposes of illustration, such a wheel includes a rim 65 which is connected to the hub portion by S-shaped springs 66. The outer ends of the spring 66 are secured between bosses 67 on the rim 65 and plates 68. These plates 68 are secured to the bosses by bolts 69, or the like. The inner ends of the springs 66 may be conveniently secured by clamping elements 70, which are maintained in position by bolts 71, or the like. Thus, the springs tend to reduce jarring effects as do the pneumatic tires.

While certain preferred forms of the invention have been shown and described, it is to be clearly understood that various changes in the details of construction and arrangement of parts may be made without departing from the scope of the invention as set forth in the appended claims.

We claim:

1. A gang mower comprising a main traction framework formed of pivotally united traction frame sections so connected and related as to be rigid or inflexible against relative movement in planes parallel to the ground, also inflexible in vertical planes parallel to the direction of travel, and movably supported on an assemblage of pairs of ground-wheels, said pairs of wheels being organized in two closely adjacent, front and rear rows, and their connections to said framework being adapted to hold all said wheels parallel to the general direction of travel regardless of their changing vertical displacements, a cutter frame wholly supported on each pair of ground-wheels for limited pivotal movement about a horizontal, transverse axis, and carrying cutter mechanism at its free end operated by one at least of its pair of ground-wheels, and means connected with said traction framework for supporting said free ends at a level establishing the height of cut and being the sole means for controlling the height of cut.

2. A gang mower comprising an organization of mowing units, each of which units comprises a traction frame section supported on ground-wheels by means holding said wheels parallel to the direction of travel regardless of their changing vertical displacements, a cutter frame wholly supported on said ground-wheels for limited pivotal movement about a horizontal, transverse axis, and carrying cutter mechanism at its free end operated by one at least of said ground-wheels, and means for supporting said free end from its traction frame section to hold it at a level establishing the height of cut, all of said units being substantially identical and connected in two close-coupled, front and rear rows, the adjacent traction frames of the units in one of said rows being hinged to each other by a hinge bolt located at their proximate margins and for relative movement solely in vertical planes which are square to the direction of travel, and the traction frames of the other row being swivel-hinged to said first mentioned row for relative movement also solely in vertical planes which are square to the direction of travel, said sections thus united constituting a traction framework for the whole gang which is inflexible in vertical planes parallel to the direction of travel, as well as in planes parallel to the ground.

3. The combination of claim 10 further characterized by the hinge-bolt between adjacent sections of one row being held in mating hinge knuckles thereon and extended longitudinally therefrom to be removably received and held in a hinge knuckle on the frame section of the adjacent row to constitute the swivel hinge connection for the latter.

4. A gang mower comprising a main traction framework formed of frame members so connected and related as to be rigid or inflexible against relative movement in planes parallel to the ground, also inflexible in vertical planes parallel to the direction of travel, and spring-supported on an assemblage of pairs of ground-wheels, said pairs of wheels being organized in two closely adjacent, front and rear rows, and their connections to said framework being adapted to hold all said wheels parallel to the general direction of travel regardless of their changing vertical displacements, a cutter frame wholly supported on each pair of ground-wheels for limited pivotal movement about a horizontal, transverse axis, and carrying cutter mechanism at its free end operated by one at least of its pair of ground-wheels, and means connected with said traction framework for supporting said free ends at a level establishing the height of cut and being the sole means for controlling the height of cut.

5. A gang mower comprising a main traction framework formed of members or parts so related as to be rigid or inflexible against relative movement in planes parallel to the ground, also in vertical planes parallel to the direction of travel, and supported on an assemblage of pairs of ground-wheels, said pairs of wheels being organized in two closely adjacent, front and rear rows, and their connections to said framework being by means of springs and adapted to hold all said wheels parallel to the general direction of travel regardless of their changing vertical displacements, a cutter frame wholly supported on each pair of ground-wheels for limited pivotal movement about the axis of the pair and carrying cutter mechanism at its free end operated by one at least of its pair of ground-wheels, means connected with said traction framework for supporting said free ends at a level establishing the height of cut, such means constituting the sole means for that purpose for each cutter mechanism, and a spring acting between each cutter frame and the traction framework for thrusting said cutter mechanism downwardly to the limit permitted by such supporting means.

6. A gang mower comprising an organization of mowing units, each of which units comprises a traction frame section spring-supported on two ground-wheels by means holding said wheels parallel to the general direction of travel regardless of their changing vertical displacements, a cutter frame wholly supported on said ground-wheels for limited pivotal movement about a horizontal, transverse axis, and carrying cutter mechanism at its free end operated by one at least of said ground-wheels, means for supporting said free end from its traction frame section to hold it at a level establishing the height of cut, and spring means acting between the two frames for thrusting said cutter mechanism downwardly to the limit permitted by such supporting means, all of said units being substantially identical and connected in two close-coupled, front and rear rows, the adjacent traction frames of the units in one of said rows being hinged to each other for relative movement solely in vertical planes which are square to the direction of travel, and the traction frames of the other row being swivel-hinged to said first mentioned row for relative movement also solely in vertical planes which are square to the direction of travel.

7. A gang mower comprising an organization of mowing units, each of which units comprises a traction frame section spring-supported on two ground-wheels and holding said wheels in planes parallel to the general direction of travel notwithstanding their changing vertical displacements, a cutter frame wholly supported on the same two ground-wheels for limited pivotal movement about the axis thereof, and carrying cutter mechanism at its free end operated by one at least of said ground-wheels, means for supporting said free end from its traction frame to hold it at a level establishing the height of cut, and spring means acting between the two frames for thrusting said cutter mechanism downwardly to the limit permitted by such supporting means, all of said units being connected in two front and rear rows, the adjacent traction frames of the front row being hinged to each other for relative movement solely about an axis which extends in the general direction of travel, and the traction frames of the rear row being swivel-hinged to the frames of said first mentioned row for relative movement thereto also solely about an axis extending in the general direction of travel.

8. A gang mower comprising an organization of mowing units, each of which units comprises a traction frame section, means including springs by which such section is supported on two ground-wheels and holding said wheels in planes parallel to the general direction of travel regardless of their changing vertical displacements, a cutter frame wholly supported on the same two ground-wheels for limited pivotal movement about a horizontal, transverse axis, and carrying rotary cutter mechanism at its free end operated by one at least of said ground-wheels, means for suspending said free end from its traction frame to support it at a level establishing the height of cut, and another spring acting between the center of said cutter frame and said traction frame for thrusting said cutter mechanism downwardly to the limit permitted by such suspension or supporting means, all of said units being substantially identical and connected in two close-coupled rows, front and rear, the adjacent traction frames of the units in one of said rows being hinged to each other for relative movement solely in vertical planes which are square to the general direction of travel, and the traction frames of the other row being individually swivel-hinged to the frames of said first mentioned row for relative movement also solely in vertical planes which are square to the general direction of travel.

9. A gang mower comprising an assemblage of mowing units, each of which comprises a traction frame section, means supporting said frame section on two ground-wheels below the tops thereof and holding said wheels parallel to the general direction of travel, said means including springs, a cutter frame wholly supported on the same two ground-wheels for limited pivotal movement about the axis thereof, and carrying cutter mechanism at its free end operated by one at least of said ground-wheels, means for supporting said free end from its traction frame to hold its cutter mechanism at a level establishing the height of cut, such means constituting the sole means for that purpose, and another spring acting between the two frames for thrusting said cutter mechanism downwardly to the limit permitted by such supporting means, all of said units being connected in two rows, front and rear, each containing several units, the adjacent traction frames of the units in the front row being directly hinged to each other for relative movement solely about axes which extend in the direction of travel, and the traction frames of the other row being swivel-hinged to the frames of said first mentioned row for relative movement also solely about axes extending in the general direction of travel.

10. The combination of claim 3 further characterized by the hinge connections between two adjacent traction frames in one row and the hinge-connections between such two frames and the adjacent frame in the other row, all having a common axis extending in the direction of travel and respectively represented by longitudinal bolts the removal of which disconnects all the units.

11. A tractor-hauled gang mower comprising a main traction framework formed of members so related as to be rigid or inflexible against relative movement in planes parallel to the ground and in vertical planes parallel to the direction of travel and supported on an assemblage of pairs of ground-wheels, said pairs of wheels being organized in two closely-coupled front and rear rows and their connections to said framework being by means of springs and adapted to hold all said wheels parallel to the general direction of travel regardless of their changing vertical displacements, a cutter frame wholly supported on each pair of ground-wheels for limited pivotal movement about a horizontal, transverse axis and carrying cutter mechanism at its free end operated by one at least of its pair of ground-wheels, means for supporting said free end from said traction framework to sustain it at a level establishing the height of cut, and hauling connections for said machine including snubbing means extending from each side of the center of the machine to the tractor hauling means, adapted to resist departure of the machine from a position square to the direction of machine travel.

EDMUND ROSSITER SAWTELLE.
JOHN INSLEY BLAIR.